Figure 1:
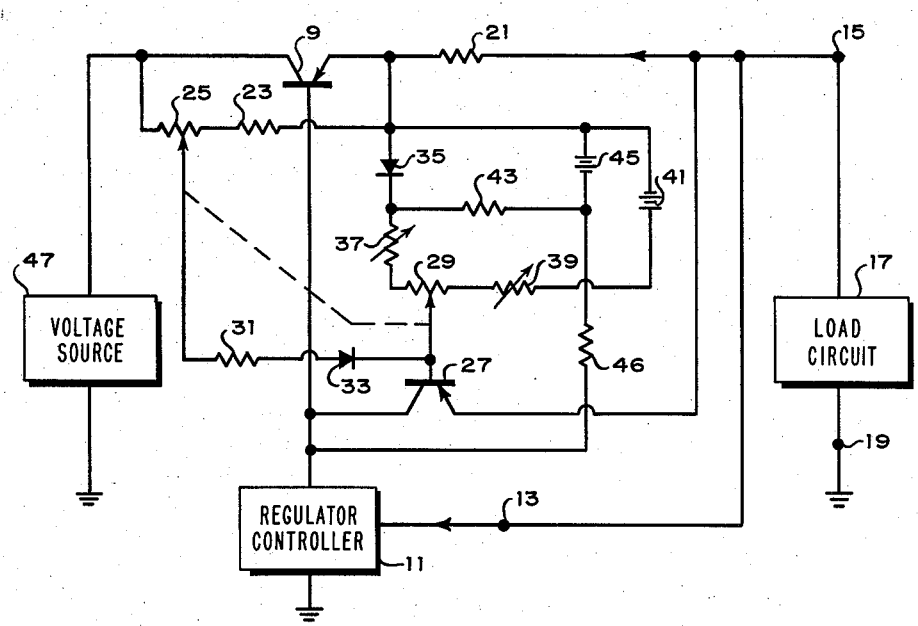

INVENTOR
WILLIAM R. M<sup>C</sup> CULLOUGH
BY
ATTORNEY

United States Patent Office 3,100,863
Patented Aug. 13, 1963

3,100,863
CURRENT LIMITED TRANSISTOR VOLTAGE REGULATOR
William R. McCullough, Menlo Park, Calif., assignor to Hewlett-Packard Company, Palo Alto, Calif., a corporation of California
Filed Aug. 3, 1961, Ser. No. 129,096
7 Claims. (Cl. 323—22)

This invention relates to current and power limiting circuits which are used in conjunction with the series regulating transistor of a regulated power supply.

Power supplies of the series regulator type use a variable impedance element in series with the voltage source to maintain the load voltage at a substantially constant value. A transistor may be used as the regulating element when connected so that its impedance is controlled by the output voltage. The output voltage of the circuit may be varied simply by increasing or decreasing the voltage across the regulating transistor. The output or load current in a fixed load resistor thus varies with changes in the output voltage. If the load resistor is small and the output voltage is increased, the load current may increase without limits and destroy the load circuit or the regulating circuit, or possibly both. One method of limiting the load current that may be supplied by the regulating circuit is to connect a small resistor in series with the load circuit and to use the voltage that appears thereacross to limit the maximum load current. However, when it is desirable to make the maximum load current adjustable, an expensive, high-power potentiometer may be required in place of the small series resistor.

Generally, when the output voltage is low and the load current is high, the regulating transistor dissipates the maximum amount of power. Under these conditions, it is frequently necessary to limit the power that is dissipated by the regulating transistor in order to reduce the danger of damaging the transistor permanently. One method of limiting the power dissipation of the regulating transistor is to connect a resistor in shunt therewith to conduct a portion of the load current. This method reduces the regulation and limits the minimum load current to a value that is greater than zero, which value is related to the resistance of the shunt resistor.

Accordingly, it is an object of the present invention to provide a circuit which limits the load current to a continuously adjustable maximum value.

It is another object of the present invention to provide a circuit which limits the power that is dissipated by the series regulating element.

It is still another object of the present invention to provide a circuit which permits the series regulating transistor to operate within the maximum power dissipation rating for all values of load current.

In accordance with a preferred embodiment of the present invention, the impedance of a transistor connected in series with a voltage source is adapted to vary in response to changes in the output voltage. An adjustable portion of the voltage that appears across a small series resistor is applied to a normally non-conductive transistor. The non-conducting transistor is adapted to become conductive when the portion of the voltage appearing across the series resistor exceeds a preset value. The conductance of the normally non-conducting transistor then becomes continuously variable from a very high or cut-off value to a very low or saturated value. In addition, the normally non-conductive transistor is also adapted to conduct when an adjustable portion of the voltage that appears across the series regulating transistor exceeds a preset value. The conductance of the normally non-conductive transistor is thus determined by the voltage appearing across the small series resistor and hence by the load current, and also by the voltage that appears across the series regulating transistor.

Figure 2:
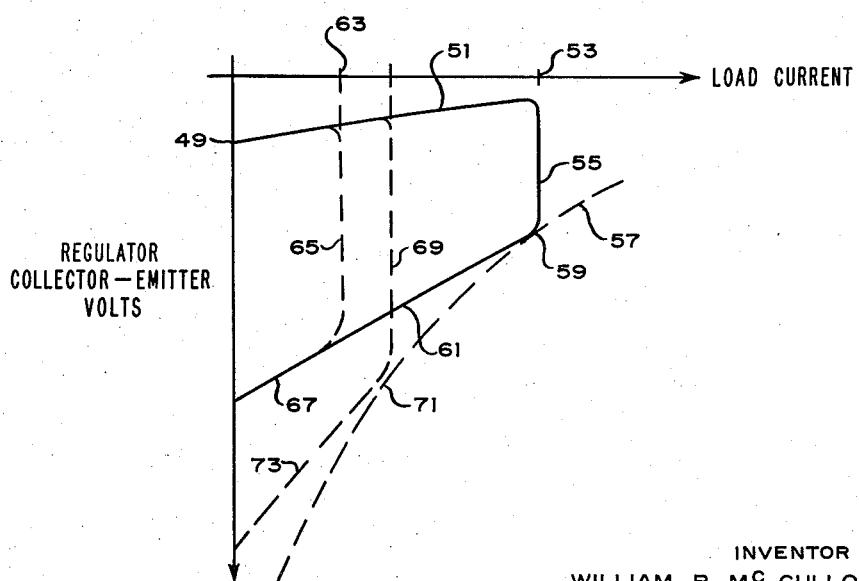

Other and incidental objects of the present invention will be apparent from a reading of this specification, and an inspection of the accompanying drawing in which:

FIGURE 1 shows a schematic diagram of a preferred embodiment of the present invention, and FIGURE 2 is a graph showing the operating characteristics of the regulating transistor in the circuit of the present invention.

Referring now to FIGURE 1, there is shown series regulating transistor 9 connected to regulator controller 11, the input terminal 13 of which is connected to receive the output voltage appearing at the output terminal 15 of the power supply. Load circuit 17 is connected between the output terminal 15 and ground terminal 19. Resistor 21 is connected between the regulating transistor 9 and the load circuit 17. Serially connected resistor 23 and potentiometer 25 are connected between the emitter and collector electrodes of regulating transistor 9. The output of regulator controller 11 is connected to the collector electrode of transistor 27, the emitter electrode of which is connected to output terminal 15. The base electrode of transistor 27 is connected to the adjustable tap of potentiometer 29 and is connected to the adjustable tap of potentiometer 25 through serially connected resistor 31 and diode 33. One terminal of potentiometer 29 is connected to the emitter electrode of regulating transistor 9 through serially connected diode 35 and resistor 37. The other terminal of potentiometer 29 is connected to the emitter electrode of regulating transistor 9 through serially connected resistor 39 and voltage supply 41. Diode 35 is shunted by serially connected resistor 43 and bias supply 45. The common terminal of resistor 43 and bias supply 45 is connected to the output of regulator controller 11 through resistor 46. An unregulated voltage source 47 is connected between ground and the collector terminal of regulating transistor 9.

Regulator controller 11 responds to changes in the voltage appearing at output terminal 15 and causes the impedance of regulating transistor 9 to so vary that the output voltage tends to remain constant. As the load current through circuit 17 increases, the voltage developed across resistor 21 increases. An adjustable portion of this voltage is applied to the emitter base junction of transistor 27. The portion of this voltage that is applied is determined by the setting of the adjustable tap on potentiometer 25. As the signal applied to the emitter-base junction of transistor 27 increases, the current which flows in the output of regulator controller 11 through resistor 46 decreases and the current in transistor 27 increases. This causes the impedance of transistor 9 to increase and thereby to limit the current flowing in load circuit 17. Transistor 27 begins to conduct when the voltage applied to the base electrode is more negative than the voltage applied to the emitter electrode. When the load current is zero, the base electrode of transistor 27 is biased positive with respect to the emitter electrode. This positive voltage is the sum of the negative voltage across diode 35, which diode is forward biased by the serially connected resistor 43 and bias supply 45, and the voltage across resistor 37 and part of potentiometer 29. The voltage across resistor 37 and potentiometer 29 is due to the voltage supply 41 which causes a current to flow through serially connected resistors 29, 37, and 39. Thus, if the adjustable tap of potentiometer 29 is at the extreme right position, then the load current must attain its maximum value before transistor 27 becomes effective to limit the load current. Resistor 39 may be adjusted one time to set this maximum value of load current. When the tap of potentiometer 29 is at the extreme left position then only a small load current is required to render transistor 27 effective in limiting the load current. Resistor 37 may be adjusted one time to set the minimum value of load current at which transistor 27 becomes effective. Without resistor 37 in the circuit the negative voltage across diode 35 would be sufficient to cause transistor 27 to conduct in the absence of load current.

When the load current through load circuit 17 increase to the level set by potentiometer 29, then a decrease in the resistance of load circuit 17 cannot increase the load current. If the current through load circuit 17 remains substantially constant as the load resistance decreases, then the voltage at output terminal 15 with respect to ground must necessarily decrease. Thus, if the voltage source 47 provides a substantially constant voltage, the voltage appearing across regulating transistor 9 increases as the load resistance decreases. The power dissipated by regulating transistor 9 thus increases with increasing voltage drop across the regulator. The portion of the voltage that appears across regulating transistor 9 is applied to the base-emitter junction of transistor 27 through serially connected resistor 31 and diode 33. The portion of the voltage that is applied to the transistor is determined by the position of the tap on potentiometer 25. When the portion of the voltage that appears across transistor 9 exceeds the value of the breakdown voltage of diode 33, transistor 27 begins to conduct more heavily and thereby causes the impedance of transistor 9 to increase further. Thus, the conductance of transistor 27 and hence the impedance of regulator transistor 9 is controlled by the signal that is related to the load current and by the signal that is related to the voltage appearing across the regulating transistor 9.

The graph of FIGURE 2 shows the voltage that appears across regulating transistor 9 as a function of a load current. At zero load current, a small voltage 49 appears across the regulator transistor 9. As the load current increases for a constant output voltage, the current-voltage characteristic follows along the segment 51 of the curve. The slope of segment 51 is due primarily to the voltage drop that develops across the internal impedance of voltage source 47 of FIGURE 1. When the load current increases to the value 53, no further increase in load current can be achieved as the load resistance decreases. Segment 55 of the curve thus follows along the value of maximum load current, as determined by the setting of potentiometer 29 of FIGURE 1. Hyperbolic curve 57 is a plot of the maximum power dissipation permissible by the regulating transistor 9. Thus, as the voltage across the regulating transistor increases for a constant load current, the point 59 on the curve of maximum capable power dissipation is reached. At this point, the diode 33 becomes conductive and causes transistor 27 to conduct current more heavily, thereby further increasing the impedance of regulating transistor 9. The curve thus follows along segment 61 for a load resistance that is decreasing toward zero.

If the maximum current is set to a smaller value 63 by potentiometer 29, then the characteristic follows segment 65 of the curve. The limiting circuit of the present invention would thus operate at less than maximum capabilities in the region of values designated as 67. However, by operating potentiometers 25 and 29 simultaneously, the characteristic may follow segment 69 to point 71 on the power dissipation curve. At point 71, the portion of the voltage appearing across transistor 9 attains a value that is related to the portion of the signal which is related to the load current. At point 71, diode 33 thus becomes conductive at a new and different value of voltage across transistor 9. Thus, the characteristic curve follows along segment 72 which has a greater slope than segment 61 as the load resistance decreases. By operating the potentiometers 25 and 29 simultaneously, the regulating transistor in the circuit of the present invention operates more nearly at the maximum value of power dissipation. Ideally, the portion of the characteristic curve following point 59 should follow the hyperbolic curve 57 of maximum power dissipation. This may be achieved simply by continuously varying resistor 31 of FIGURE 1 in response to increasing voltage across transistor 9. This may be achieved by replacing resistor 31 with a transistor circuit that is adapted to decrease conductivity as the voltage appearing across transistor 9 increases. In this manner, the regulating transistor 9 of the present invention may be operated at the maximum power dissipation rating for all values of load current limiting.

Therefore, the circuit of the present invention provides means to limit the load current to a predetermined value so that equipment connected between output terminals of the power supply may be protected against momentary overloads and burn-out. In addition, internal protection for the regulating element of a power supply is provided by the circuit of the present invention so that not only may the external load circuit be protected, but also the power supply itself be protected.

I claim:

1. In a power supply having a series regulator which is responsive to the voltage appearing across a load circuit, a resistor in series with said load circuit to produce a first voltage that is related to the current in said load circuit, means connected to said regulator for producing a second voltage that is related to the voltage appearing across said series regulator, a gain element connected to control the impedance of said regulator and connected to receive the first voltage, said gain element becoming effective to increase continually the impedance of said regulator when the first voltage exceeds a predetermined value, and normally non-conductive means connected to said gain element for applying thereto said second voltage, said non-conductive means becoming conductive for rendering said gain element effective further to increase continually the impedance of said regulator when the second voltage exceeds a predetermined value.

2. In a power supply having a series regulator which is responsive to the voltage appearing across a load circuit, a resistor in series with said load circuit to produce a first voltage that is related to the current in said load circuit, an amplifier connected to control the impedance of said regulator and connected to receive the first voltage, said amplifier becoming effective to increase the impedance of said regulator when the first voltage exceeds a predetermined value, and normally non-conductive means connected to said amplifier, said non-conductive means becoming conductive to apply to said amplifier a second voltage when said first voltage exceeds said predetermined value and the voltage across said regulator exceeds a predetermined value, said amplifier becoming effective further to increase the impedance of said regulator in response to the second voltage applied thereto.

3. In a power supply having a series regulator which is adapted to change impedance in response to the changes in voltage appearing across a load circuit, a resistor connected in series with said load circuit to produce a first voltage that is related to the current in said load circuit, an amplifier connected to control the impedance of said regulator, adjustable means to apply a portion of the first voltage to said amplifier, normally non-conductive means connected to said amplifier for applying thereto a portion of the voltage appearing across the regulator, said amplifier becoming effective to increase the impedance of said regulator when said portion of the first voltage exceeds a predetermined value and further to increase the impedance of said regulator when said non-conductive means becomes conductive in response to the combination of the first voltage exceeding said predetermined value and said portion of the voltage appearing across the regulator exceeding a predetermined value.

4. In a power supply having a series regulator which is adapted to change impedance in response to the changes in voltage appearing across a load circuit, a resistor connected in series with said load circuit to produce a first voltage related to the current in said load circuit, an amplifier connected to control the impedance of said regulator, a bias supply connected to said amplifier for rendering the amplifier non-effective when the first voltage is below a selected value, adjustable means to apply a portion of the first voltage to said amplifier, a device which shows high conductivity for voltage applied thereto above a predetermined value, means including said device and connected to said amplifier for applying thereto a portion of the voltage appearing across the regulator, said amplifier becoming effective to increase the impedance of said regulator when said portion of the first voltage exceeds said selected value and further to increase the impedance of said regulator when the voltage appearing across said device exceeds said predetermined value.

5. In a power supply having a series regulating transistor which is adapted to change impedance in response to the changes in voltage appearing across a load circuit, a resistor connected in series with said load circuit to produce a first voltage that is related to the current in said load circuit, a transistor connected to control the impedance of said regulating transistor, a bias supply connected to said transistor for rendering said transistor cut-off when the first voltage is below a selected value, adjustable means to apply a portion of the first voltage to said transistor, and a breakdown diode connected to said transistor for applying thereto a portion of the voltage appearing across the regulating transistor, said transistor becoming biased to conduction to increase the impedance of said regulating transistor when said portion of the first voltage applied to said transistor exceeds said selected value and further to increase the impedance of said regulating transistor when the voltage appearing across said diode exceeds the breakdown voltage.

6. In a power supply having a series regulating transistor which is adapted to change impedance in response to the changes in voltage appearing across said load circuit, a resistor connected in series with said load circuit to produce a first voltage that is related to the current in said load circuit, a transistor connected to control the impedance of said regulating transistor, a bias supply connected to said transistor for rendering said transistor cut-off when the first voltage is below a selected value, a Zener diode connected to apply to said transistor a portion of the voltage appearing across the regulating transistor, the portion of the second voltage applied to said transistor being adjustable between maximum and minimum values, said transistor becoming biased to conduction to increase the impedance of said regulating transistor when said portion of the first voltage exceeds said selected value and further to increase the impedance of said regulating transistor when the voltage appearing across the Zener diode exceeds the breakdown voltage of said diode, and means to adjust simultaneously the portions of the first voltage and voltage across said regulating transistor which are applied to said transistor.

7. In a power supply having a series regulating transistor which is adapted to change conductance in response to the changes in the voltage appearing across a load circuit, a resistor in series with said load circuit to produce a first voltage is proportional to the current in said load circuit, a transistor connected to control the conductance of said regulating transistor, a bias supply connected to said transistor to render said transistor cut-off when the first voltage is below a selected value, means connected to said transistor for applying thereto a portion of the first voltage, said portion being variable between adjustable maximum and minimum values, circuit means including a Zener diode and connected to said transistor for applying thereto an adjustable portion of the voltage appearing across said regulating transistor, said circuit means being adapted to increase the impedance of the circuit for applying to said transistor said portion of the voltage across the regulating transistor as said portion is varied, said transistor becoming biased to conduction to decrease the conductance of said regulating transistor when said portion of the first voltage exceeds said selected value and further to decrease the conductance of said regulating transistor when the voltage appearing across the Zener diode exceeds the breakdown voltage therefor.

References Cited in the file of this patent

UNITED STATES PATENTS

| 2,904,742 | Chase | Sept. 15, 1959 |
| 2,942,174 | Harrison | June 21, 1960 |
| 2,981,884 | Tighe | Apr. 25, 1961 |

OTHER REFERENCES

"Electronics," Designing Transistorized, Sept. 23, 1960.